US011477502B2

(12) United States Patent
Takahashi et al.

(10) Patent No.: US 11,477,502 B2
(45) Date of Patent: Oct. 18, 2022

(54) DISTRIBUTION DESIGN SUPPORT METHOD, DISTRIBUTION DESIGN SUPPORT APPARATUS AND PROGRAM

(71) Applicant: NIPPON TELEGRAPH AND TELEPHONE CORPORATION, Tokyo (JP)

(72) Inventors: Shoko Takahashi, Musashino (JP); Kazuhisa Yamagishi, Musashino (JP); Jun Okamoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/291,680

(22) PCT Filed: Oct. 29, 2019

(86) PCT No.: PCT/JP2019/042404
§ 371 (c)(1),
(2) Date: May 6, 2021

(87) PCT Pub. No.: WO2020/095767
PCT Pub. Date: May 14, 2020

(65) Prior Publication Data
US 2022/0007067 A1    Jan. 6, 2022

(30) Foreign Application Priority Data

Nov. 8, 2018  (JP) ............................. JP2018-210211
Mar. 28, 2019 (JP) ............................. JP2019-064755

(51) Int. Cl.
*H04H 60/32*      (2008.01)
*H04N 21/24*      (2011.01)
(Continued)

(52) U.S. Cl.
CPC ....... *H04N 21/2408* (2013.01); *H04N 21/238* (2013.01); *H04N 21/25808* (2013.01); *H04N 21/2662* (2013.01)

(58) Field of Classification Search
CPC ............. H04N 21/2408; H04N 21/238; H04N 21/25808; H04N 21/2662;
(Continued)

(56) References Cited

U.S. PATENT DOCUMENTS 7,117,518 B1 * 10/2006 Takahashi .......... H04N 21/4668
725/86
7,343,616 B1 * 3/2008 Takahashi .............. H04N 21/47
725/35
(Continued)

OTHER PUBLICATIONS

"Parametric bitstream-based quality assessment of progressive download and adaptive audio visual streaming services over reliable transport", ITU-T P.1203, Nov. 2016.
(Continued)

Primary Examiner — Michael B. Pierorazio
(74) Attorney, Agent, or Firm — IPUSA, PLLC

(57) ABSTRACT

This streaming design assistance method assists in the selection of an encoding condition for increasing the watching time in adaptive bitrate video streaming by causing a computer to execute: estimating a relationship between a watching time or an abandonment rate and an application quality index according to a mathematical model on the basis of an actual value of a watching time of each of a plurality of first sessions related to video streaming and an actual value of an application quality index of each of the sessions; estimating the application quality index of each of the sessions for each of a plurality of encoding conditions related to video streaming on the basis of the plurality of encoding conditions and an actual value of time-series throughput of each of a plurality of second sessions; and
(Continued)

applying the application quality index estimated under each of the encoding conditions to the relationship to estimate an average watching time of the plurality of second sessions.

9 Claims, 9 Drawing Sheets

(51) Int. Cl.
*H04N 21/238* (2011.01)
*H04N 21/258* (2011.01)
*H04N 21/2662* (2011.01)

(58) Field of Classification Search
CPC ....... H04N 21/23805; H04N 21/25891; H04N 21/6379; H04N 21/44218; H04N 21/6582
See application file for complete search history.

(56) References Cited

U.S. PATENT DOCUMENTS

| | | | | |
|---|---|---|---|---|
| 7,962,935 | B2* | 6/2011 | Kurosaki | H04H 60/31 |
| | | | | 725/39 |
| 8,510,770 | B1* | 8/2013 | Oztaskent | H04H 60/72 |
| | | | | 709/201 |
| 8,531,606 | B2* | 9/2013 | Pyo | H04N 21/426 |
| | | | | 348/731 |
| 2002/0056087 | A1* | 5/2002 | Berezowski | H04N 21/6175 |
| | | | | 348/E7.071 |
| 2003/0145319 | A1* | 7/2003 | Sato | H04H 60/64 |
| | | | | 725/20 |
| 2005/0149964 | A1* | 7/2005 | Thomas | H04N 21/4667 |
| | | | | 348/E7.071 |
| 2006/0136965 | A1* | 6/2006 | Ellis | H04N 21/25891 |
| | | | | 348/E7.071 |
| 2007/0136753 | A1* | 6/2007 | Bovenschulte | H04N 21/44222 |
| | | | | 348/E7.071 |
| 2007/0143778 | A1* | 6/2007 | Covell | H04N 21/4788 |
| | | | | 725/135 |
| 2007/0294740 | A1* | 12/2007 | Drake | H04N 21/6405 |
| | | | | 348/E7.071 |
| 2009/0147786 | A1* | 6/2009 | Li | H04N 7/17336 |
| | | | | 370/390 |
| 2012/0124620 | A1* | 5/2012 | Nishizawa | H04N 21/488 |
| | | | | 725/34 |
| 2016/0234078 | A1* | 8/2016 | Jana | H04L 47/30 |
| 2018/0176622 | A1* | 6/2018 | Sheppard | H04N 21/252 |

OTHER PUBLICATIONS

"Parametric bitstream-based quality assessment of progressive download and adaptive audio visual streaming services over reliable transport—Video quality estimation module", ITU-T P.1203.1, Dec. 2016.

"Parametric bitstream-based quality assessment of progressive download and adaptive audio visual streaming services over reliable transport—Audio quality estimation module", ITU-T P.1203.2, Nov. 2016.

"Parametric bitstream-based quality assessment of progressive download and adaptive audiovisual streaming services aver reliable transport—Quality integration module", TU-T P.1203.3, Dec. 2016.

Kazuhisa Yamagishi and Takanori Hayashi, "Parametric Quality-Estimation Model for Adaptive-Bitrate-Streaming Services", IEEE Transactions of Multimedia, vol. 19, No. 7, Jul. 2017.

Werner Robitza et al., "A Modular HTTP Adaptive Streaming QoE Model-Candidate for ITU-T P.1203 ("P.NATS")", Ninth International Conference on Quality of Multimedia Experience(QoMEX), May 2017.

Alexander Raake et al., "A Bitstream-based, Scalable Video-Quality Model for HTTP Adaptive Streaming: ITU-T P.1203.1", Ninth International Conference on Quality of Multimedia Experience(QoMEX), May 2017.

Florin Dobrian et al., "Understanding the impact of video quality on user engagement" SIGCOMM'11, Aug. 15, 2011.

S. Shunmuga Krishnan and Ramesh K. Sitaraman, "Video Stream Quality Impacts Viewer Behavior:Inferring Causality Using Quasi-Experimental Designs", 2012 Internet Measurement Conference, Nov. 14, 2012, pp. 211-224.

Athula Balachandran et al., "Developing a Predictive Model of Quality of Experience for Internet Video", ACM SIGCOMM 2013 conference, Aug. 12, 2013, pp. 339-350.

Hyunwoo Nam et al., "QoE Matters More Than QoS: Why People Stop Watching Cat Videos", IEEE INFOCOM 2016—The 35th Annual IEEE International Conference on Computer Communications, Apr. 2016.

* cited by examiner

DISTRIBUTION DESIGN SUPPORT METHOD, DISTRIBUTION DESIGN SUPPORT APPARATUS AND PROGRAM

TECHNICAL FIELD

The present invention relates to a streaming design assistance method, a streaming design assistance device, and a program.

BACKGROUND ART

With development of codec technique, video streaming technique, and display technique, adaptive bitrate video streaming services for mobile terminals have spread rapidly. The adaptive bitrate video streaming enables videos to be played back smoothly by streaming video data of optimal bitrates according to a communication status in an environment where a network condition varies from time to time such as a mobile environment.

On the other hand, adaptive bitrate video streaming does not always guarantee smooth video playback, but encoding quality may deteriorate and playback stop may occur due to an excessive decrease in throughput and depletion of the buffer of a receiving terminal and the user experience quality (QoE: Quality of Experience) may decrease remarkably. Since quality deterioration leads to decrease in watching time and service cancellation as well as decrease in QoE, a video streaming service provider needs to evaluate these indices quantitatively and manage the indices so that a certain level is maintained.

Now, it is assumed that a watching time is used as a management target index. As factors that affect the watching time, user factors such as a gender and an age and service factors including content factors (a type, a content length, a ranking, and the like) corresponding to each piece of content, a streaming server, a network, and a terminal which are components of a video streaming service, encoding performance factors (a bitrate, a frame rate, a resolution, and the like), network performance factors (throughput, packet delay oscillation, a packet loss, a packet delay, and the like) and terminal performance factors (a buffer size and the like) are considered. Moreover, among the service factors, the encoding performance factors, the network performance factors, and the terminal performance factors are considered to affect the watching time via the application quality (the application usage quality such as playback stop, a playback start delay, and bitrate oscillation) that a user experiences actually.

Therefore, if the relationship between the watching time and various factors (service factors, application quality, and the like) that affect the same is clarified, a video streaming service provider can select an optimal condition after evaluating the influence on the watching time quantitatively when controllable conditions (encoding conditions or the like) among the service factors are changed, and can design the streaming based on the watching time.

As conventional techniques, techniques (NPL 1 to NPL 7) for evaluating QoE on the basis of media information (a bitrate, a resolution, and a frame rate) and buffering information (a playback stop count, a playback stop time, and a playback stop interval) are known.

In addition to these techniques, techniques (NPL 8 to NPL 11) for clarifying the relationship between the watching time and an index (an abandonment rate) similar thereto and various factors that affect the same are known. NPL 8 visualizes the relationship between a watching time and an application quality index such as a playback stop percentage (=[playback stop time]/[session time])(session is a period from the start to the end of specific user watching specific content), a playback stop count percentage (=[playback stop count]/[session time]), an average bitrate, and a frame rate and shows correlations between some indices and the watching time.

Similarly, NPL 9 visualizes the relationship between the watching time and a playback start delay and an abandonment rate (=[number of abandoned sessions]/[total number of sessions]) or a normalized playback stop time (=[playback stop time]/[content length]) and shows a correlation between them.

NPL 10 proposes a model for estimating a watching time on the basis of an application quality index such as a playback stop percentage (=[playback stop time]/[session time]), a playback stop count percentage (=[playback stop count]/[session time]), and an average bitrate.

NPL 11 visualizes the relationship between the abandonment rate and a playback stop percentage (=[playback stop time]/[session time]) or a bitrate change percentage (=[accumulated bitrate change value]/[watching time]).

CITATION LIST

Non Patent Literature

[NPL 1] Parametric bitstream-based quality assessment of progressive download and adaptive audiovisual streaming services over reliable transport, Recommendation ITU-T P. 1203, November 2016.

[NPL 2] Parametric bitstream-based quality assessment of progressive download and adaptive audiovisual streaming services over reliable transport—Video quality estimation module, Recommendation ITU-T P. 1203.1, December 2016.

[NPL 3] Parametric bitstream-based quality assessment of progressive download and adaptive audiovisual streaming services over reliable transport—Audio quality estimation module, Recommendation ITU-T P. 1203.2, November 2016.

[NPL 4] Parametric bitstream-based quality assessment of progressive download and adaptive audiovisual streaming services over reliable transport—Quality integration module, Recommendation ITU-T P. 1203.3, December 2016.

[NPL 5] K. Yamagishi and T. Hayashi, "Parametric Quality-Estimation Model for Adaptive-Bitrate-Streaming Services", IEEE Transactions of Multimedia, Vol. 19, No. 7, pp. 1545-1557, July 2017.

[NPL 6] W. Robitza, M. N. Garcia, and A. Raake, "A Modular HTTP Adaptive Streaming QoE Model—Candidate for ITU-T P. 1203 ("P.NATS")", Proceedings of the 2017 Ninth International Conference on Quality of Multimedia Experience (QoMEX), May 2017.

[NPL 7] A. Raake, M. N. Garcia, W. Robitza, P. List, S. Goring, B. Feiten, "A Bitstream-based, Scalable Video-Quality Model for HTTP Adaptive Streaming: ITU-T P. 1203.1", Proceedings of the 2017 Ninth International Conference on Quality of Multimedia Experience (QoMEX), May 2017.

[NPL 8] F. Dobrian, V. Sekar, A. Awan, I. Stoica, D. Joseph, A. Ganjam, J. Zhan, H. Zhang, "Understanding the impact of video quality on user engagement", in Proc. of SIGCOMM' 11, 2011.

[NPL 9] S. S. Krishnan and R. K. Sitaraman, "Video Stream Qualityimpacts Viewer Behavior: Inferring Causality Using Quasi-Experimental Designs", Proceedings of the 2012 Internet Measurement Conference, pp. 211-224, November 2012.

[NPL 10] A. Balachandran, V. Sekar, A. Akella, S. Seshan, I. Stoica, and H. Zhang, "Developing a Predictive Model of Quality of Experience for Internet Video", Proceedings of the ACM SIGCOMM 2013 conference, pp. 339-350, August 2013.

[NPL 11] H. Nam, K. Kim, and H. Schulzrinne, "QoE Matters More Than QoS: Why People Stop Watching Cat Videos", Proceedings of the IEEE INFOCOM 2016—The 35th Annual IEEE International Conference on Computer Communications, April 2016.

SUMMARY OF THE INVENTION

Technical Problem

However, NPL 1 to NPL 7 propose models for estimating QoE but do not estimate the watching time.

NPL 8, NPL 9, and NPL 11 quantify the relationship between the watching time or an index (an abandonment rate) similar thereto and the application quality index related to the index (a playback stop percentage, a playback stop count percentage, an average bitrate, a frame rate, a playback start delay, a normalized playback stop time, a bitrate change percentage, and the like). However, NPL 8, NPL 9, and NPL 11 do not present a model for estimating the watching time on the basis of the application quality index.

NPL 10 proposes a model for estimating the watching time on the basis of the application quality index (a playback stop percentage, a playback stop count percentage, an average bitrate, and the like) but has the following two problems.

A first problem is that the proposed watching time estimation model is based on a decision tree (binary tree) model and, since the depth of the tree is shallow, estimated values of the watching time concentrate on various types of discrete values and this model is not practically usable.

A second problem is a problem common to NPL 8 and is that the correlation between the watching time and the application quality index such as a playback stop percentage (=[playback stop time]/[session time]) and a playback stop count percentage (=[playback stop count]/[session time]) is naturally high (in the negative direction), the watching time estimation model based on these indices do not make sense. Since the session time in the denominator of the playback stop percentage (=[playback stop time]/[session time]) and the playback stop count percentage (=[playback stop count]/[session time]) is an index having a very high correlation (in the positive direction) with the watching time, even if there is little correlation between the watching time and the playback stop time or the playback stop count, it appears as if there is correlation (in the negative direction) between the watching time and the playback stop percentage or the playback stop count percentage due to the influence of the reciprocal of the session time. Therefore, estimation of the watching time based on these indices means estimating the watching time on the basis of the reciprocal of the session time, and such a model is not practically usable.

The present invention has been made to solve the above-described problems, and an object thereof is to assist in selection of encoding conditions for increasing a watching time in adaptive bitrate video streaming.

Means for Solving the Problem

In order to solve the problems, a streaming design assistance method causes a computer to execute: a first estimation step of estimating a relationship between a watching time or an abandonment rate and an application quality index according to a mathematical model on the basis of an actual value of a watching time of each of a plurality of first sessions related to adaptive bitrate video streaming and an actual value of an application quality index of each of the sessions; a second estimation step of estimating the application quality index of each of the sessions for each of a plurality of encoding conditions related to adaptive bitrate video streaming on the basis of the plurality of encoding conditions and an actual value of time-series throughput of each of a plurality of second sessions which is the same as or different from the plurality of first sessions; and a third estimation step of applying the application quality index estimated in the second estimation step under each of the encoding conditions described in the second estimation step to the relationship estimated in the first estimation step to estimate an average watching time of the plurality of second sessions.

Effects of the Invention

It is possible to assist in selection of encoding conditions for increasing a watching time in adaptive bitrate video streaming.

DESCRIPTION OF EMBODIMENTS

Figure 1:
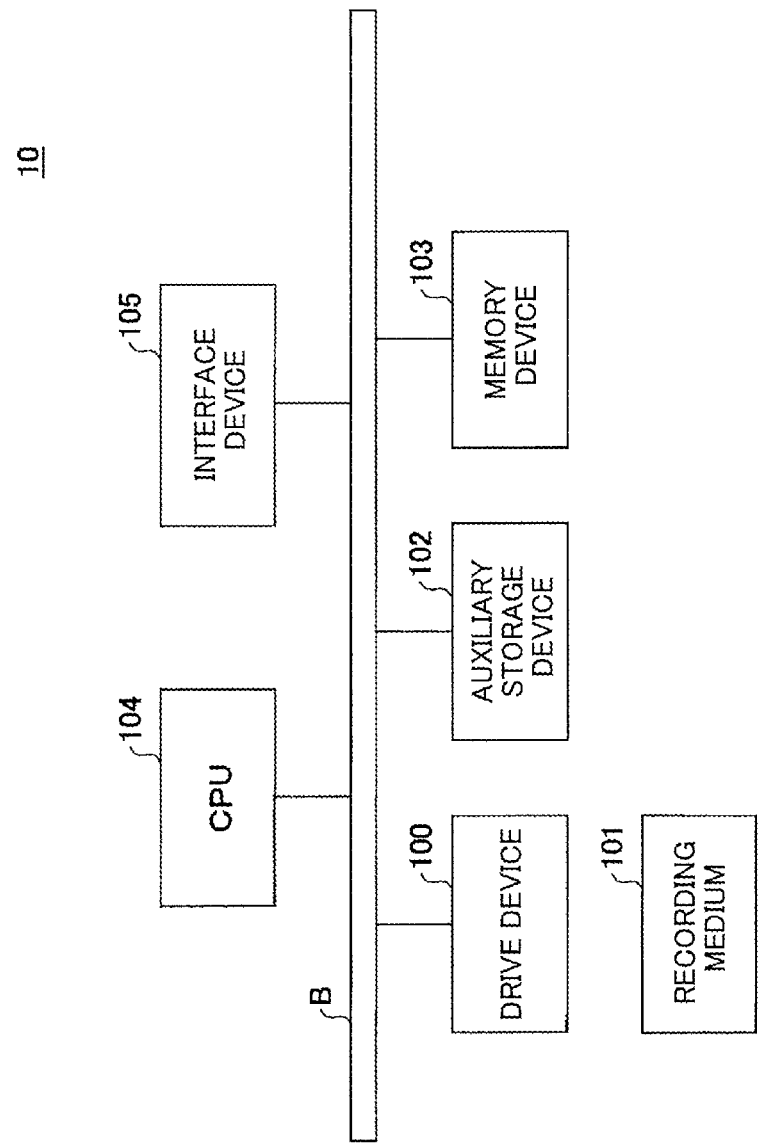
FIG. 1 is a diagram illustrating a hardware configuration example of a streaming design assistance device 10 according to a first embodiment.

Hereinafter, an embodiment of the present invention will be described in detail with reference to the drawings. FIG. 1 is a diagram illustrating a hardware configuration example of a streaming design assistance device 10 according to a first embodiment. The streaming design assistance device 10 illustrated in FIG. 1 includes a drive device 100, an auxiliary storage device 102, a memory device 103, a CPU 104, an interface device 105, and the like connected to each other via a bus B.

A program that realizes processing in the streaming design assistance device 10 is provided by a recording medium 101 such as a CD-ROM. When the recording medium 101 having the program stored therein is set on the drive device 100, the program is installed from the recording medium 101 into the auxiliary storage device 102 via the drive device 100. However, the program may not always be installed on the recording medium 101, but the program may be downloaded from another computer via a network. The auxiliary storage device 102 stores the installed program and stores necessary files, data, and the like.

The memory device 103 reads the program from the auxiliary storage device 102 and stores the same when a program activation instruction is received. The CPU 104 executes a function related to the streaming design assistance device 10 according to the program stored in the memory device 103. The interface device 105 is used as an interface for connection to a network.

Figure 2:
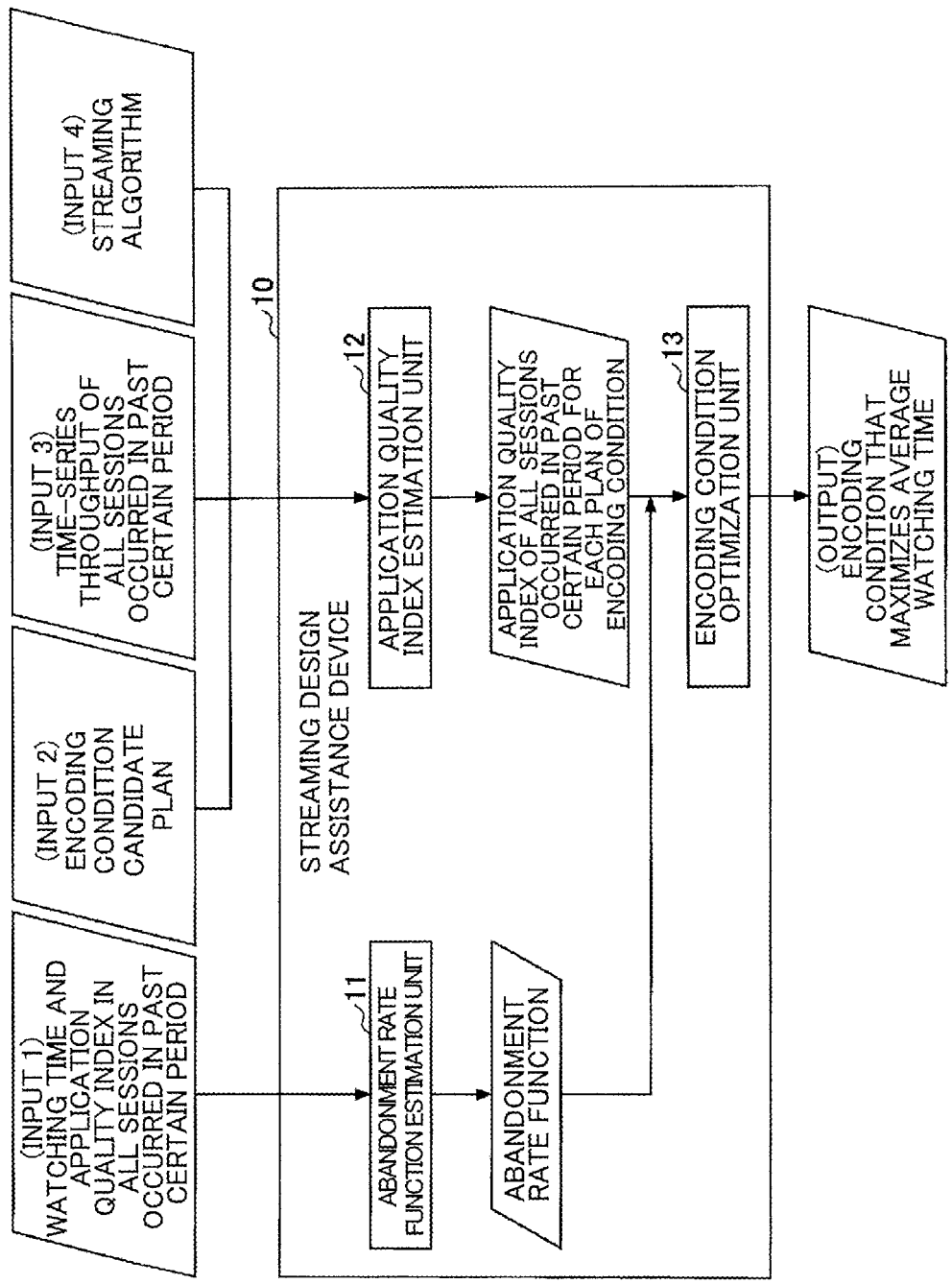
FIG. 2 is a diagram illustrating a functional configuration example of the streaming design assistance device 10 according to the first embodiment.

FIG. 2 is a diagram illustrating a functional configuration example of the streaming design assistance device 10 according to the first embodiment. As illustrated in FIG. 2, the streaming design assistance device 10 includes an abandonment rate function estimation unit 11, an application quality index estimation unit 12, an encoding condition optimization unit 13, and the like in order to assist in streaming design related to the adaptive bitrate video streaming service. These units are realized by one or more programs installed on the streaming design assistance device 10 causing the CPU 104 to execute processing.

The abandonment rate function estimation unit 11 receives, as its input, a "watching time in all sessions occurred in past certain period" and an "application quality index of all sessions" and outputs an "abandonment rate function" indicating the relationship between the watching time and the application quality index and the abandonment rate. The abandonment rate is a probability of watching to be abandoned (stopped) in an arbitrary watching time of a session which has been watched continuously until the watching time.

The "watching time of all sessions occurred in past certain period" refers to a watching time of a plurality of all sessions (from the start to the end of a specific user watching specific content) occurred in a past certain period (an arbitrary setting period such as one hour, one day, or one week). The users and the content in respective sessions may be different or the same.

The "application quality index of all sessions" is an actual value of the application quality index (a playback stop time, bitrate oscillation, and the like) of each session corresponding to the input watching time of "watching time of all sessions occurred in the past certain period".

The abandonment rate function estimation unit 11 estimates an "abandonment rate function" which is a function indicating an abandonment rate for an arbitrary watching time and an arbitrary application quality index with respect to the input. The "abandonment rate function" corresponds to a hazard function of a proportional hazard model in survival time analysis. The influence of an application quality index such as a playback stop time is taken into consideration therein, and an abandonment rate for the same watching time oscillates depending on a session.

Specifically, an abandonment rate in a watching time t of a session i, that is, a hazard function $h(z_i,t)$ (a probability of watching to be abandoned in the watching time t under assumption that the session i has been watched continuously until the watching time t) of the watching time of the session i is represented by Formula (1) below.

[Formula 1]

$$h(z_i,t)=h_0(t)\exp(\gamma^T z_i) \quad (1)$$

Here, $z_i$ is an application quality index vector of the session i. $\gamma$ is a coefficient vector corresponding to the application quality index vector $z_i$. $h_0(t)$ is an abandonment rate at the watching time t of a reference session watched under a reference quality (the quality when the application quality index vector is a zero vector). That is, the "abandonment rate function" is a model that represents the abandonment rates of individual sessions in a form of multiplying an abandonment rate of the reference session by the influence of an application quality index different for respective sessions.

The application quality index vector $z_i$ in Formula (1) is a vector made up of variables such as, for example, a playback start delay, a playback stop count, an average playback stop time, an average bitrate, a bitrate oscillation count, and an accumulated bitrate change time. These variables may be quantitative variables or qualitative variables. Even if an original variable is a quantitative variable, the variable may be appropriately converted to a qualitative variable (a category variable or a dummy variable). For example, when an average bitrate has a value in the range of 90 kbps to 3500 kbps, the average bitrate may be input to the abandonment rate function estimation unit 11 in the state of a quantitative variable. Alternatively, for example, the average bitrate may be classified into six categories of less than 150 kbps, 150 kbps or more and less than 300 kbps, 300 kbps or more and less than 450 kbps, 450 kbps or more and less than 750 kbps, 750 kbps or more and less than 2250 kbps, and not less than 2250 kbps and be input to the abandonment rate function estimation unit 11 as category variables to which numbers 1, 2, 3, 4, 5, and 6 are sequentially allocated. Alternatively, the category variables of the six categories may be converted to the following five dummy variables and be input to the abandonment rate function estimation unit 11. That is, when a category of an average bitrate of not less than 2250 kbps is set as a reference, the category variables may be converted to five dummy variables including a dummy variable indicating whether the average bitrate corresponds to the category of less than 150 kbps, a dummy variable indicating whether the average bitrate corresponds to the category of 150 kbps or more and less than 300 kbps, a dummy variable indicating whether the average bitrate corresponds to the category of 300 kbps or more and less than 450 kbps, a dummy variable indicating whether the average bitrate corresponds to the category of 450 kbps or more and less than 750 kbps, and a dummy variable indicating whether the average bitrate corresponds to the category of 750 kbps or more and less than 2250 kbps.

The coefficient vector $\gamma$ in Formula (1) is estimated on the basis of a watching time $t_i$ (i=1, 2, . . . , N) of N sessions observed in a video watching experiment of adaptive bitrate video streaming and an application quality index vector $z_i$ of each session. The estimation is performed by a method of maximizing a partial likelihood represented by Formula (2) below.

[Formula 2]

$$PL(\gamma) = \prod_{i=1}^{D} \frac{\exp(\gamma^T z_i)}{\sum_{k \in R(t_i)} \exp(\gamma^T z_k)} \quad (2)$$

Here, D is the number of sessions of which the watching has not been ended due to the end of experiment among N sessions observed in the experiment. i (=1, 2, . . . , D) is the ID of a session of which the watching has not been ended due to the end of experiment. $R(t_i)$ is a risk set at time $t_i$, that is, a set of sessions of which the watching time is $t_i$ or more among N sessions.

The application quality index estimation unit 12 receives, as its input, an "encoding condition candidate plan", a "time-series throughput of all sessions occurred in past certain period", and a "streaming algorithm" and outputs an "application quality index of all sessions occurred in the past certain period for each plan of the encoding condition".

The "encoding condition candidate plan" refers to a candidate plan of the encoding condition discussed by the video streaming service provider as a service providing condition of the adaptive bitrate video streaming. That is, the "encoding condition candidate plan" is a candidate plan related to how many stages of bitrate a video to be arranged on a streaming server will be encoded and a specific value to which the bitrate level of each stage will be set. For example, candidate plan 1 has six stages of 1 Mbps, 2.5 Mbps, 5 Mbps, 8 Mbps, 16 Mbps, and 40 Mbps and candidate plan 2 has six stages of 1.5 Mbps, 4 Mbps, 7.5 Mbps, 12 Mbps, 24 Mbps, and 60 Mbps.

The "time-series throughput of all sessions occurred in past certain period" is an actual value of the time-series throughput observed in a plurality of all sessions occurred in a past certain period (an arbitrary setting period such as one hour, one day, or one week). The past certain period to be processed by the application quality index estimation unit 12 may be the same as or different from the past certain period to be processed by the abandonment rate function estimation unit 11. That is, each session to be processed by the application quality index estimation unit 12 may be the same as or different from each session to be processed by the abandonment rate function estimation unit 11.

The "streaming algorithm" is an algorithm that determines which bitrate video segment (one obtained by dividing a video file into small units and also called a chunk) will be received by a terminal with respect to the throughput which varies from time to time. This algorithm is given in the form of a rule and is conditionally branched depending on a situation such as whether a segment is being downloaded, a buffer is full or depleted or neither of them, for example. For example, a rule that the highest bitrate lower than a measured throughput (for example, 75% or smaller) is selected on the basis of the measured value when the buffer is neither full nor depleted may be used. Moreover, a rule that the highest bitrate is selected when the buffer is full (for example, 20 seconds or more) and the lowest bitrate is selected when the buffer is depleted may be used. Furthermore, a rule that, when a download time is significantly longer than a playback time of a segment during downloading of the segment, it is determined that the throughput has decreased dramatically, the downloading is stopped, and the segment of the same content is downloaded again at the highest bitrate lower than the throughput measured recently may be used.

The application quality index estimation unit 12 estimates the following values by a simulation based on the streaming algorithm on the basis of the above-described input.

The values are a bitrate level at each time point of reception or playback of a video segment received or played back in each session of a past certain period when each candidate plan of the encoding condition and the time-series throughput of all sessions are applied to the adaptive bitrate video streaming, and an application quality index (a playback stop time, a bitrate oscillation, or the like) observed as a result thereof.

A known tool such as Sabre (https://github.com/UMass-LIDS/sabre/) can be used as a simulation tool that outputs an application quality index with respect to the input of an encoding condition, a streaming algorithm, and a time-series throughput.

The encoding condition optimization unit 13 receives, as its input, the "abandonment rate function" which is the output of the abandonment rate function estimation unit 11 and the "application quality index of all sessions occurred in the past certain period for each plan of the encoding condition" which is the output of the application quality index estimation unit 12 and outputs an "encoding condition that maximizes the average watching time".

In response to the above inputs, the encoding condition optimization unit 13 applies the "abandonment rate function" to the "application quality index of all sessions occurred in past certain period for each plan of encoding condition" according to Formula (3) below with respect to each candidate plan of the encoding condition to estimate an average watching time E(t) in all sessions (an average value of expected value of the watching time of each session).

[Formula 3]

$$E(t) = \frac{1}{N}\sum_{i=1}^{N}\int_{0}^{\infty} f(z_i, t) t dt \tag{3}$$

Here, N is the number of sessions. $f(z_i,t)$ is a probability density function (dependent on the application quality index vector $z_i$) of the watching time of the session i. When the hazard function $h(z_i,t)$ of Formula (1) is obtained, the probability density function $f(z_i,t)$ is also obtained.

The encoding condition optimization unit 13 estimates the average watching time E(t) in all sessions and then derives the encoding condition that maximizes the average watching time E(t) as an optimal solution.

Figure 3:
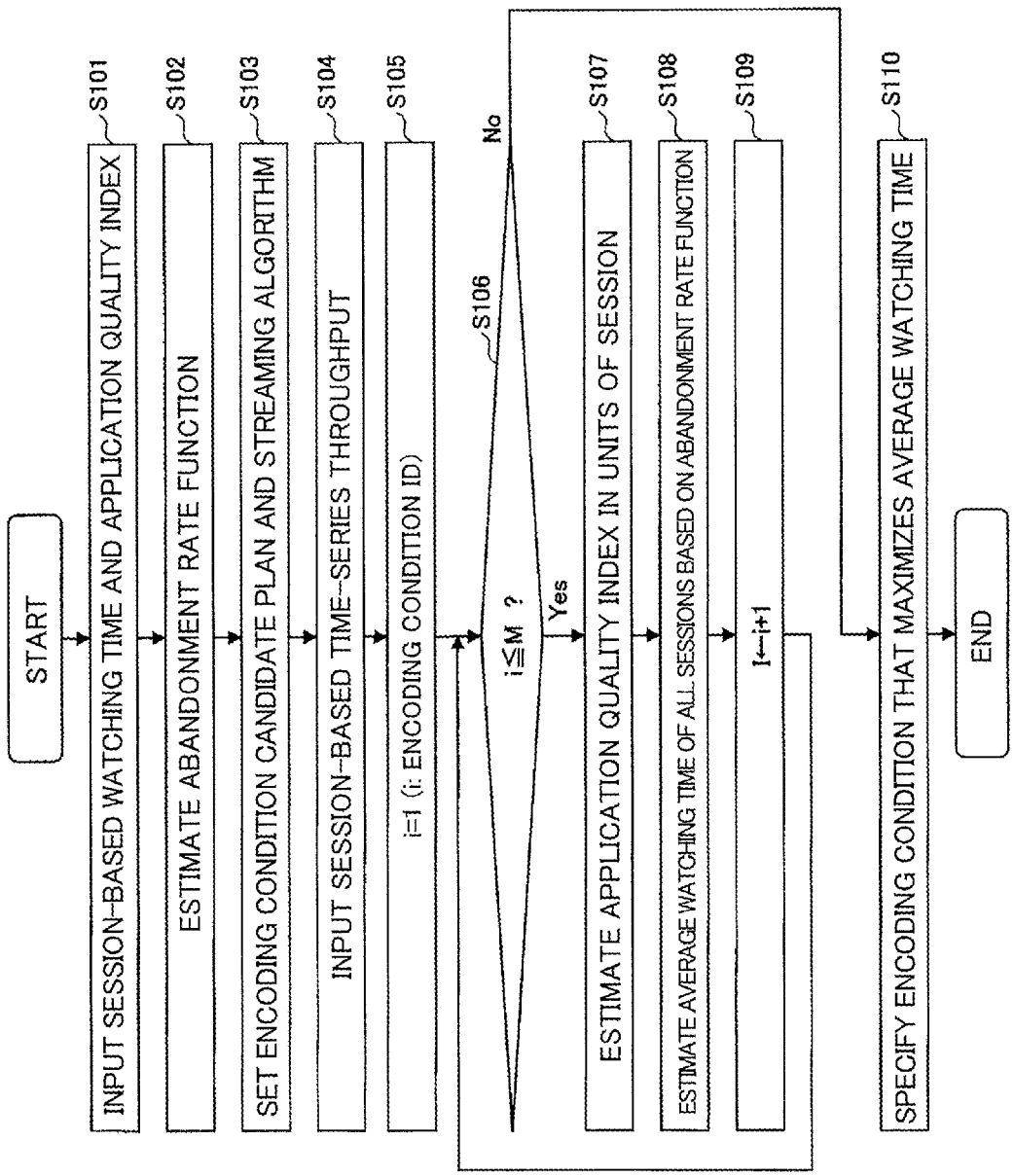
FIG. 3 is a flowchart for describing an example of a processing procedure executed by the streaming design assistance device 10 according to the first embodiment.

Next, the processing procedure executed by the streaming design assistance device 10 will be described. FIG. 3 is a flowchart for describing an example of the processing procedure executed by the streaming design assistance device 10 according to the first embodiment.

In step S101, the abandonment rate function estimation unit 11 receives, as its input, the actual values of a session-based watching time (for each session) of a plurality of all sessions occurred in the past certain period and a session-based application quality index (for each session). The actual values of the session-based application quality index and the session-based watching time may be stored in the auxiliary storage device 102 or the like, for example.

Subsequently, the abandonment rate function estimation unit 11 estimates the abandonment rate function on the basis of the information input in step S101 (S102).

Subsequently, the application quality index estimation unit 12 sets M encoding condition candidate plans and a streaming algorithm in itself (in the application quality index estimation unit 12) (S103). The M encoding condition candidate plans and the streaming algorithm may be stored in advance in the auxiliary storage device 102, for example.

Subsequently, the application quality index estimation unit 12 receives, as its input, the session-based time-series throughput (for each session) of a plurality of all sessions occurred in the past certain period (S104). The past certain period to be processed by the application quality index estimation unit 12 may be the same as or different from the past certain period to be processed by the abandonment rate function estimation unit 11. That is, each session to be processed by the application quality index estimation unit 12 may be the same as or different from each session to be processed by the abandonment rate function estimation unit 11. Moreover, the session-based time-series throughput may be stored in advance in the auxiliary storage device 102, for example.

Subsequently, the application quality index estimation unit 12 substitutes 1 into the variable i (S105). The variable i is the ID for identifying an encoding condition of each encoding condition candidate plan. The encoding condition ID of each encoding condition candidate plan is an integer of 1 to M. Subsequently, steps S107 to S109 are executed for each encoding condition (S106).

In step S107, the application quality index estimation unit 12 executes a simulation in which the encoding condition (i) and the time-series throughput of each session are applied to adaptive bitrate video streaming on the basis of the streaming algorithm in units of session to estimate the application quality index of the session.

Subsequently, the encoding condition optimization unit 13 estimates the average watching time in all sessions by applying the estimated session-based application quality index to Formula (3) (S108). Subsequently, the encoding condition optimization unit 13 adds 1 to i (S109) and returns to step S106.

When steps S107 to S109 are executed for all (M) encoding condition candidate plans (S106: No), the encoding condition optimization unit 13 specifies an encoding condition candidate plan that maximizes the average watching time and outputs the encoding condition (S110). That is, the encoding condition candidate plan when the average watching time estimated in step S108 is the largest is output. The encoding condition optimization unit 13 may sort the M encoding condition candidate plans in descending order of average watching times estimated in step S108 and output the sorting result.

As described above, according to the first embodiment, it is possible to construct a mathematical model for estimating a watching time on the basis of various factors related to the watching time. Moreover, it is possible to perform streaming design (optimization of encoding conditions) that maximizes the average watching time. Specifically, by estimating the average watching time for each setting value of the encoding condition, a condition that maximizes the average watching time among the candidate plans of the encoding condition is derived. Therefore, it is possible to assist in selection (streaming design) of an encoding condition for increasing the watching time in adaptive bitrate video streaming. As a result, it is possible to assist in optimization of an encoding condition.

Next, a second embodiment will be described. In the second embodiment, differences from the first embodiment will be described. Features of the second embodiment, which are not specifically described, may be the same as those of the first embodiment.

Figure 4:
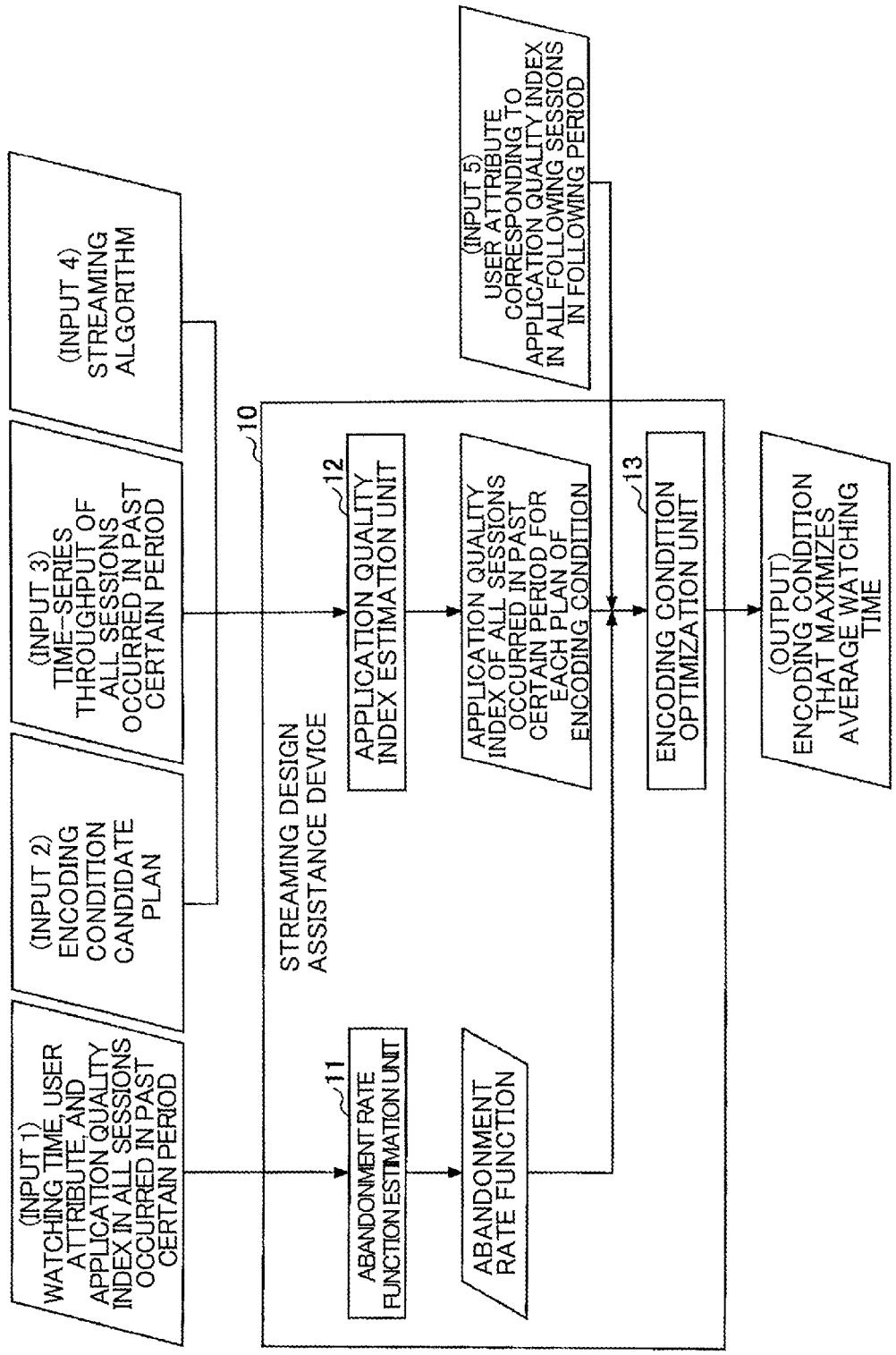
FIG. 4 is a diagram illustrating a functional configuration example of a streaming design assistance device 10 according to a second embodiment.

FIG. 4 is a diagram illustrating a functional configuration example of the streaming design assistance device 10 according to the second embodiment. In FIG. 4, the same or corresponding portions as those of FIG. 2 will be denoted by the same reference numerals, and the description thereof will be omitted. As illustrated in FIG. 4, the functions of the streaming design assistance device 10 are the same as those of the first embodiment, but the pieces of data input and output are different.

In FIG. 4, a "user attribute of all sessions occurred in past certain period" is added to the input of the abandonment rate function estimation unit 11. This is an actual value of the user attribute related to the viewer of a video streamed in each session corresponding to the "watching time of all sessions occurred in past certain period" which is also the input of the abandonment rate function estimation unit 11.

Since the "user attribute of all sessions occurred in past certain period" is added to the input of the abandonment rate function estimation unit 11, the hazard function represented by Formula (1) in the first embodiment is changed to Formula (4) below in the second embodiment.

[Formula 4]

$$h(x_i, x_i, t) = h_0(t) \exp(\alpha^T x_i + \gamma^T z_i) \quad (4)$$

Here, $x_i$ is a user attribute vector of a session i. $z_i$ is an application quality index vector. $\alpha$ is a coefficient vector corresponding to the user attribute vector $x_i$. $\gamma$ is a coefficient vector corresponding to the application quality index vector $z_i$. $h_0(t)$ is an abandonment rate at a watching time t of a reference session that a reference user (a user of which the user attribute vector is a zero vector) watches under a reference quality (the quality in which the application quality index vector is a zero vector). That is, in the second embodiment, the "abandonment rate function" is a model that represents the abandonment rates of individual sessions in a form of multiplying the abandonment rate of the reference session by the influence of an application quality index and a user attribute different for respective sessions.

In Formula (4), the user attribute vector $x_i$ is a vector made up of variables such as a gender, an age, or a user ID, for example. These variables may be quantitative variables or qualitative variables. Even if an original variable is a quantitative variable, the variable may be appropriately converted to a qualitative variable (a category variable or a dummy variable).

The coefficient vectors $\alpha$ and $\gamma$ in Formula (4) are estimated on the basis of a watching time $t_i$ (i=1, 2, ..., N) of N sessions observed in a video watching experiment of adaptive bitrate video streaming and the user attribute vector $x_i$ and the application quality index vector $z_i$ of each session. The estimation is performed by a method of maximizing a partial likelihood represented by Formula (5) below.

[Formula 5]

$$PL(\alpha, \gamma) = \prod_{i=1}^{D} \frac{\exp(\alpha^T x_i + \gamma^T z_i)}{\sum_{k \in R(t_i)} \exp(\alpha^T x_k + \gamma^T z_k)} \quad (5)$$

Here, D is the number of sessions of which the watching has not been ended due to the end of experiment among N sessions observed in the experiment. i (=1, 2, ..., D) is the ID of a session of which the watching has not been ended due to the end of experiment. $R(t_i)$ is a risk set at time $t_i$, that is, a set of sessions of which the watching time is $t_i$ or more among N sessions.

As illustrated in FIG. 4, in the second embodiment, a "user attribute corresponding to application quality index in all following sessions in following period" is added to the input of the encoding condition optimization unit 13. Here, the following period is the same period as the past certain period (an arbitrary setting period such as one hour, one day, or one week) serving as a target when the application quality index estimation unit 12 estimates an application quality index. Moreover, the all following sessions is a plurality of all sessions occurred in the following period.

Since the "user attribute corresponding to application quality index of all following sessions in following period" is added to the input of the encoding condition optimization unit 13, the average watching time E(t) represented by Formula (3) in the first embodiment is changed to Formula (6) below in the second embodiment.

[Formula 6]

$$E(t) = \frac{1}{N}\sum_{i=1}^{N} \int_{0}^{\infty} f(x_i, z_i, t) t \, dt \quad (6)$$

Here, N is the number of sessions. $f(x_i, z_i, t)$ is a probability density function (dependent on the user attribute vector $x_i$ and the application quality index vector $z_i$) of the watching time of the session i. When the hazard function $h(x_i, z_i, t)$ of Formula (4) is obtained, the probability density function $f(x_i, z_i, t)$ is also obtained.

Figure 5:
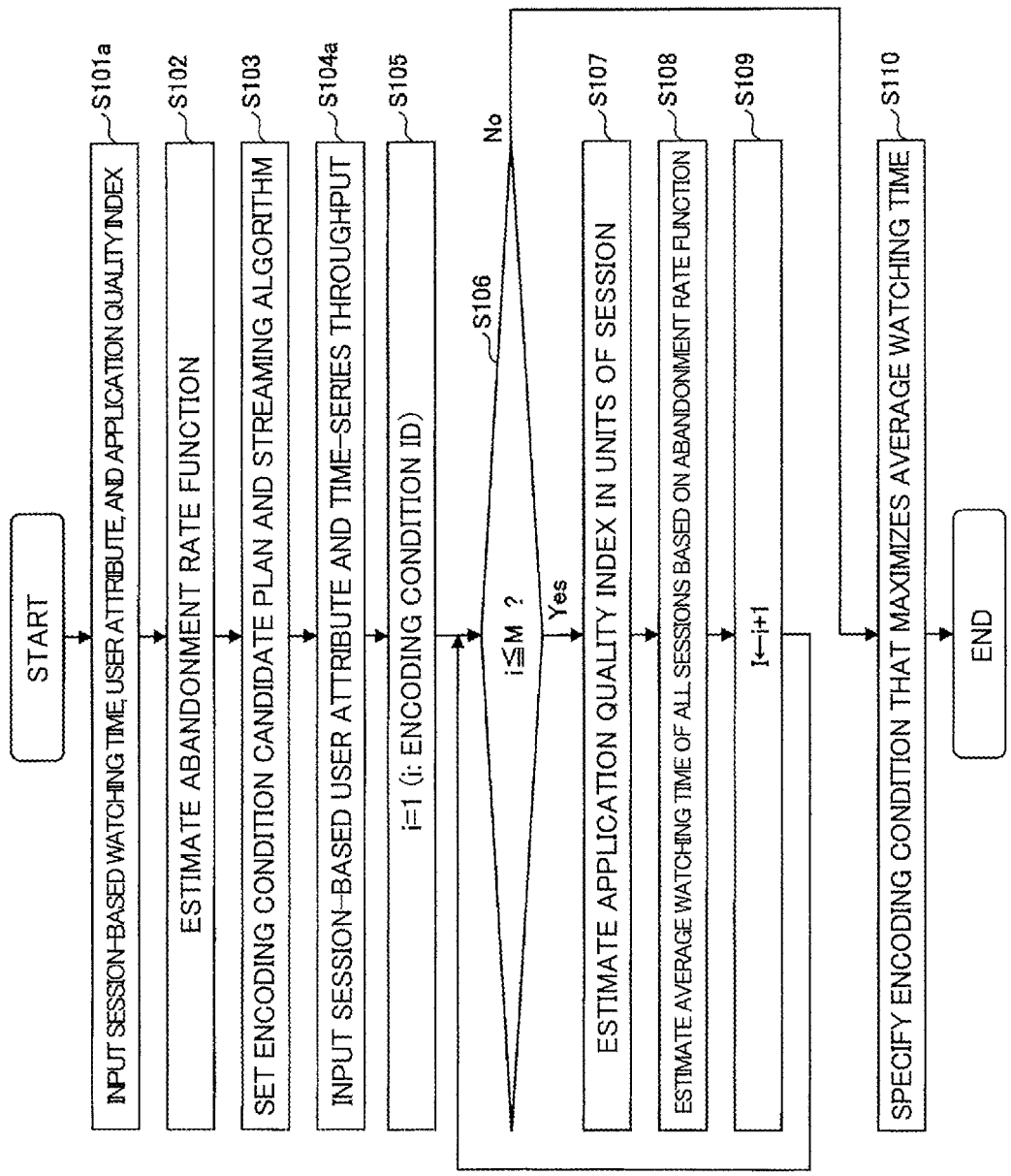
FIG. 5 is a flowchart for describing an example of a processing procedure executed by the streaming design assistance device 10 according to the second embodiment.

FIG. 5 is a flowchart for describing an example of the processing procedure executed by the streaming design assistance device 10 according to the second embodiment. In FIG. 5, the same steps as those of FIG. 3 will be denoted by the same step numbers and the description thereof will be omitted. As illustrated in FIG. 5, the flow of processing executed by the streaming design assistance device 10 is basically the same as that of the first embodiment. However, steps S101 and S104 are partially different, step S101 is replaced with step S101a and step S104 is replaced with step S104a.

Specifically, an "actual value of session-based user attribute occurred in past certain period" is added to the input of step S101a. This is used as the input when the abandonment rate function estimation unit 11 estimates the abandonment rate function in step S102 and needs to be the same period and the same session as those of the "session-based watching time and session-based application quality index occurred in past certain period" which is the input of step S101a.

The "actual value of session-based user attribute occurred in past certain period" is also added to the input of step S104a. This is used as the input when the encoding condition optimization unit 13 estimates the average watching time in all sessions in step S108 and needs to be the same period and the same session as those of the "estimated value of session-based application quality index" which is the input of step S108.

As described above, according to the second embodiment, it is possible to construct a mathematical model for estimating the watching time by taking the user attribute of each session further into consideration. Moreover, according to the second embodiment, it is possible to perform streaming design (optimization of encoding conditions) that maximizes the average watching time.

Next, a third embodiment will be described. In the third embodiment, differences from the first embodiment will be described. Features of the third embodiment, which are not specifically described, may be the same as those of the first embodiment.

Figure 6:
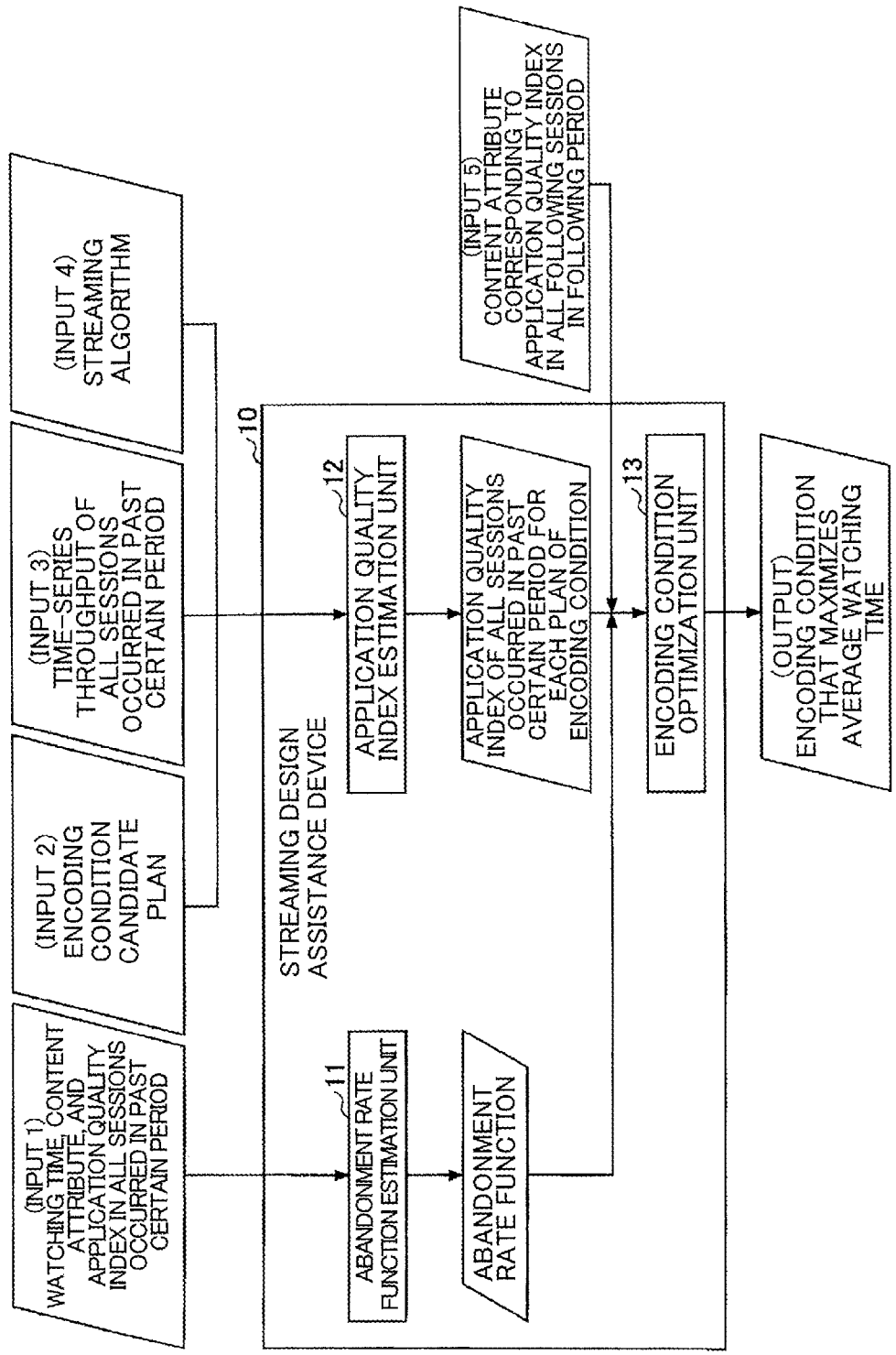
FIG. 6 is a diagram illustrating a functional configuration example of a streaming design assistance device 10 according to a third embodiment.

FIG. 6 is a diagram illustrating a functional configuration example of the streaming design assistance device 10 according to the third embodiment. In FIG. 6, the same or corresponding portions as those of FIG. 2 will be denoted by the same reference numerals, and the description thereof will be omitted. As illustrated in FIG. 6, the functions of the streaming design assistance device 10 are the same as those of the first embodiment, but the pieces of data input and output are different.

In FIG. 6, a "content attribute of all sessions occurred in past certain period" is added to the input of the abandonment rate function estimation unit 11. This is an actual value of a content attribute related to content of a video streamed in each session corresponding to the "watching time of all sessions occurred in past certain period" which is also the input of the abandonment rate function estimation unit 11.

Since the "content attribute of all sessions occurred in past certain period" is added to the input of the abandonment rate function estimation unit 11, the hazard function represented by Formula (1) in the first embodiment is changed to Formula (7) below in the third embodiment.

[Formula 7]

$$h(y_i, z_i, t) = h_0(t) \exp(\beta^T y_i + \gamma^T z_i) \quad (7)$$

Here, $y_i$ is a content attribute vector of a session i. $z_i$ is an application quality index vector. $\beta$ is a coefficient vector corresponding to the content attribute vector $y_i$. $\gamma$ is a coefficient vector corresponding to the application quality index vector $z_i$. $h_0(t)$ is an abandonment rate at a watching time t of a reference session in which reference content (content of which the content attribute vector is a zero vector) is watched under a reference quality (the quality in which the application quality index vector is a zero vector). That is, in the third embodiment, the "abandonment rate function" is a model that represents the abandonment rates of individual sessions in a form of multiplying the abandonment rate of the reference session by the influence of an application quality index and a content attribute different for respective sessions.

In Formula (7), the content attribute vector $y_i$ is a vector made up of variables such as a content length, a genre, a ranking, or a content ID, for example. These variables may be quantitative variables or qualitative variables. Even if an original variable is a quantitative variable, the variable may be appropriately converted to a qualitative variable (a category variable or a dummy variable).

The coefficient vectors $\beta$ and $\gamma$ in Formula (7) are estimated on the basis of a watching time $t_i$ (i=1, 2, . . . , N) of N sessions observed in a video watching experiment of adaptive bitrate video streaming and the content attribute vector $y_i$ and the application quality index vector $z_i$ of each session. The estimation is performed by a method of maximizing a partial likelihood represented by Formula (8) below.

[Formula 8]

$$PL(\beta, \gamma) = \prod_{i=1}^{D} \frac{\exp(\beta^T y_i + \gamma^T z_i)}{\sum_{k \in R(t_i)} \exp(\beta^T y_k + \gamma^T z_k)} \quad (8)$$

Here, D is the number of sessions of which the watching has not been ended due to the end of experiment among N sessions observed in the experiment. i (=1, 2, . . . , D) is the ID of a session of which the watching has not been ended due to the end of experiment. $R(t_i)$ is a risk set at time $t_i$, that is, a set of sessions of which the watching time is $t_i$ or more among N sessions.

As illustrated in FIG. 6, in the third embodiment, a "content attribute corresponding to application quality index in all following sessions in following period" is added to the input of the encoding condition optimization unit 13. Here, the following period is the same period as the past certain period (an arbitrary setting period such as one hour, one day, or one week) serving as a target when the application quality index estimation unit 12 estimates an application quality index. Moreover, the all following sessions is a plurality of all sessions occurred in the following period.

Since the "content attribute corresponding to application quality index of all following sessions in following period" is added to the input of the encoding condition optimization unit 13, the average watching time E(t) represented by Formula (3) in the first embodiment is changed to Formula (9) below in the third embodiment.

[Formula 9]

$$E(t) = \frac{1}{N} \sum_{i=1}^{N} \int_{0}^{\infty} f(y_i, z_i, t) t \, dt \quad (9)$$

Here, N is the number of sessions. $f(y_i, z_i, t)$ is a probability density function (dependent on the content attribute vector $y_i$ and the application quality index vector $z_i$) of the watching time of the session i. When the hazard function $h(y_i, z_i, t)$ of Formula (7) is obtained, the probability density function $f(y_i, z_i, t)$ is also obtained.

Figure 7:
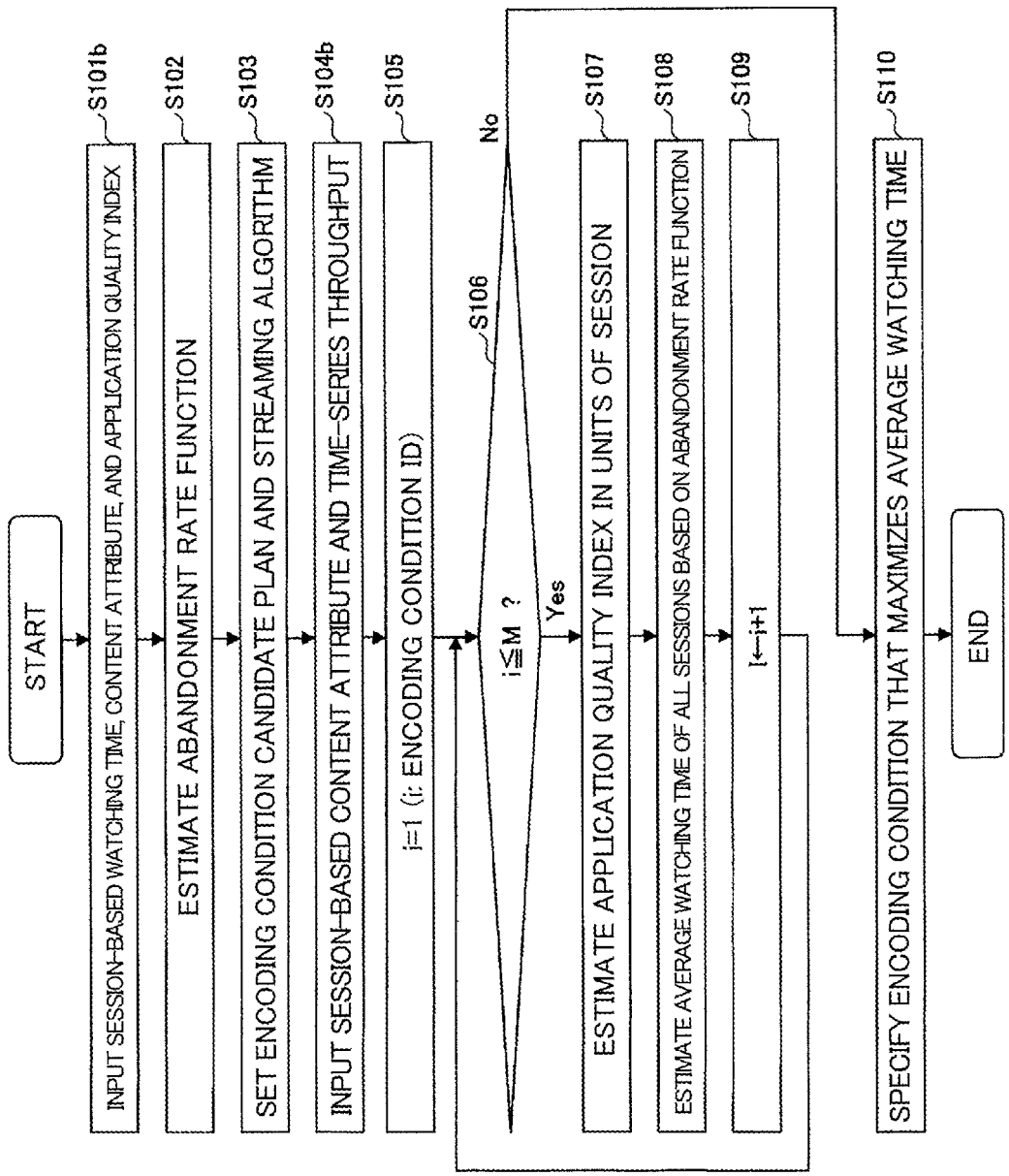
FIG. 7 is a flowchart for describing an example of a processing procedure executed by the streaming design assistance device 10 according to the third embodiment.

FIG. 7 is a flowchart for describing an example of the processing procedure executed by the streaming design assistance device 10 according to the third embodiment. In FIG. 7, the same steps as those of FIG. 3 will be denoted by the same step numbers and the description thereof will be omitted. As illustrated in FIG. 7, the flow of processing executed by the streaming design assistance device 10 is basically the same as that of the first embodiment. However, steps S101 and S104 are partially different, step S101 is replaced with step S101b and step S104 is replaced with step S104b.

Specifically, an "actual value of session-based content attribute occurred in past certain period" is added to the input of step S101b. This is used as the input when the abandonment rate function estimation unit 11 estimates the abandonment rate function in step S102 and needs to be the same period and the same session as those of the "session-based watching time and session-based application quality index occurred in past certain period" which is the input of step S101b.

The "actual value of session-based content attribute occurred in past certain period" is also added to the input of step S104b. This is used as the input when the encoding condition optimization unit 13 estimates the average watching time in all sessions in step S108 and needs to be the same period and the same session as those of the "estimated value of session-based application quality index" which is the input of step S108.

As described above, according to the third embodiment, it is possible to construct a mathematical model for estimating the watching time by taking the content attribute of each session further into consideration. Moreover, according to the third embodiment, it is possible to perform streaming design (optimization of encoding conditions) that maximizes the average watching time.

Hereinabove, three embodiments based on the proportional hazard model (a case where the application quality index only is considered, a case where the application quality index and the user attribute are considered, and a case where the application quality index and the content attribute are considered as the factors affecting the abandonment rate) have been described. However, a case where all factors including the application quality index, the user attribute, and the content attribute are considered may be exemplified as another embodiment.

Next, a fourth embodiment will be described. In the fourth embodiment, differences from the first embodiment will be described. Features of the fourth embodiment, which are not specifically described, may be the same as those of the first embodiment.

Figure 8:
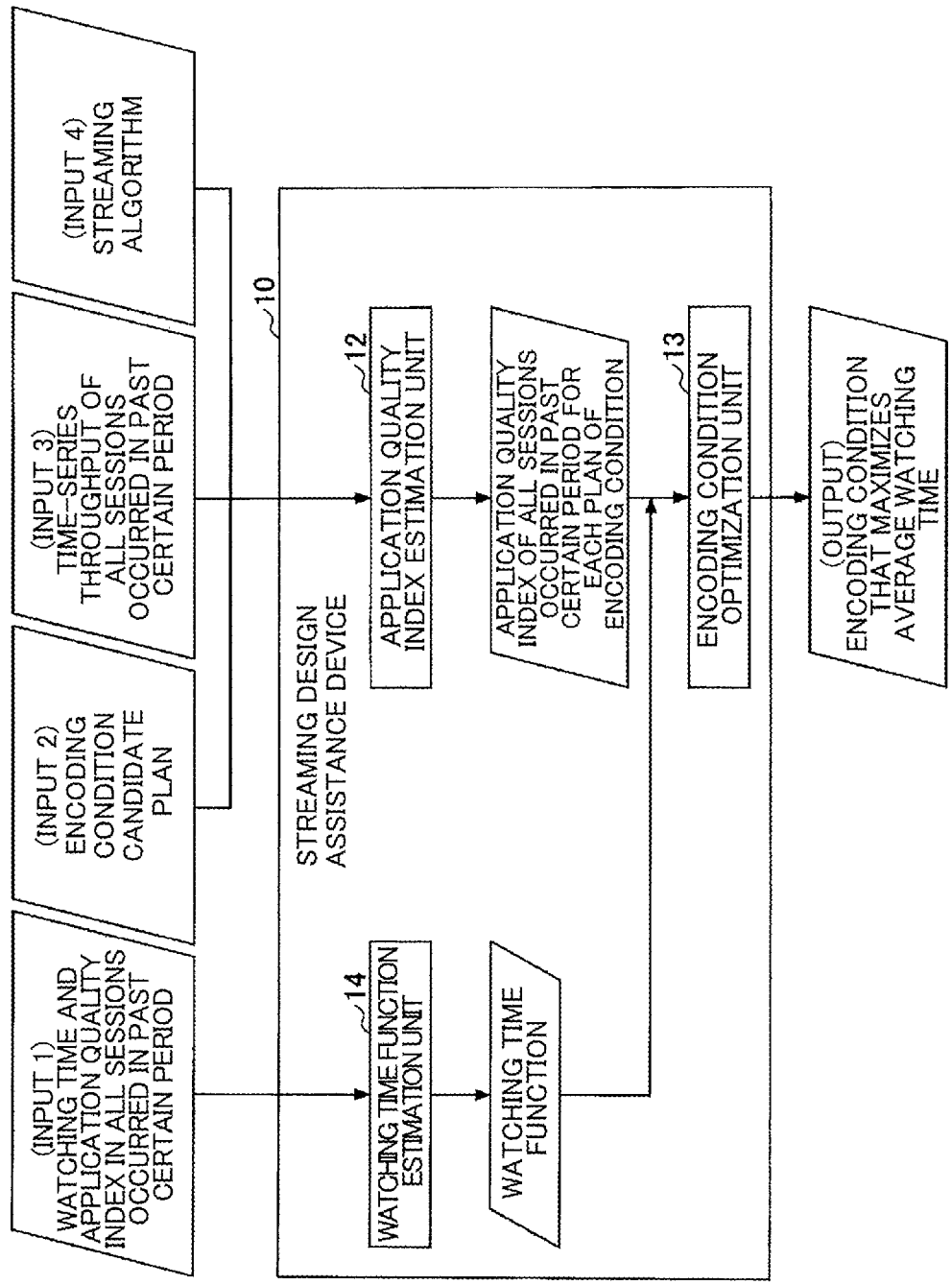
FIG. 8 is a diagram illustrating a functional configuration example of a streaming design assistance device 10 according to a fourth embodiment.

FIG. 8 is a diagram illustrating a functional configuration example of the streaming design assistance device 10 according to the fourth embodiment. In FIG. 8, the same or corresponding portions as those of FIG. 2 will be denoted by the same reference numerals, and the description thereof will be omitted. As illustrated in FIG. 8, the streaming design assistance device 10 of the fourth embodiment includes a watching time function estimation unit 14 instead of the abandonment rate function estimation unit 11. The watching time function estimation unit 14 is realized by one or more programs installed on the streaming design assistance device 10 causing the CPU 104 to execute processing.

The watching time function estimation unit 14 receives, as its input, the "watching time of all sessions occurred in past certain period" and the "application quality index of all sessions" and outputs a "watching time function" indicating the relationship between the watching time and the application quality index.

The "watching time function" follows an acceleration model in survival time analysis and a probability variable t representing the watching time of a session i is represented by Formula (10) below.

[Formula 10]

$$t = t_0 \exp(\gamma^T z_i) \quad (10)$$

Here, $z_i$ is an application quality index vector of the session i. γ is a coefficient vector corresponding to the application quality index vector $z_i$. $t_0$ is a probability variable representing the watching time of a reference session watched under a reference quality (the quality when the application quality index vector is a zero vector). That is, the "watching time function" is a model that represents the watching times of individual sessions in a form of multiplying a watching time of the reference session by the influence of an application quality index different for respective sessions.

In the case of an acceleration model, unlike the proportional hazard model, it is necessary to assume a probability density function $f(z_i, t)$ of a watching time of the session i parametrically, and an exponential distribution, the Weibull distribution, a log-normal distribution, a log-logistic distribution, and the like can be assumed as a distribution. For example, a probability density function $f(z_i, t)$ when the Weibull distribution is assumed is represented by Formula (11) below.

[Formula 11]

$$f(z_i, t) = p \varepsilon t^{p-1} \exp(-\varepsilon t^p) = p \varepsilon \{t_0 \exp(\gamma^T z_i)\}^{p-1} \exp[-\varepsilon \{t_0 \exp(\gamma^T z_i)\}^p] \quad (11)$$

The coefficient vector γ in Formulae (10) and (11) is estimated on the basis of a watching time $t_i$ (i=1, 2, ..., N) of N sessions observed in a video watching experiment of adaptive bitrate video streaming and an application quality index vector $z_i$ of each session. The estimation is performed by a method of maximizing a likelihood represented by Formula (12) below.

[Formula 12]

$$L(\gamma,p,\varepsilon)=\Pi_{i=1}^{N} f(z_i,t_i)^{\gamma_i} S(z_i,t_i)^{1-\delta_i} \quad (12)$$

Here, $f(z_i,t_i)$ is the probability density function represented by Formula (11) in which the watching time $t_i$ and the application quality index vector $z_i$ of the session i are substituted. $S(z_i,t_i)$ is a survival function (a function representing a probability of watching being continued until the watching time) corresponding to the probability density function $f(z_i,t_i)$ in which the watching time $t_i$ and the application quality index vector $z_i$ of the session i are substituted. Moreover, $\delta_i$ is a binary variable that is 0 when watching is stopped due to the end of experiment and is 1 when watching is not stopped. That is, the coefficient vector $\gamma$ is estimated by a method of maximizing the likelihood obtained by multiplying the probability that the watching time is $t_i$ or more for a session in which watching is stopped at the watching time $t_i$ and the probability that the watching time is $t_i$ for a session in which watching is ended at the watching time $t_i$ by the user's free will with respect to all sessions.

Figure 9:
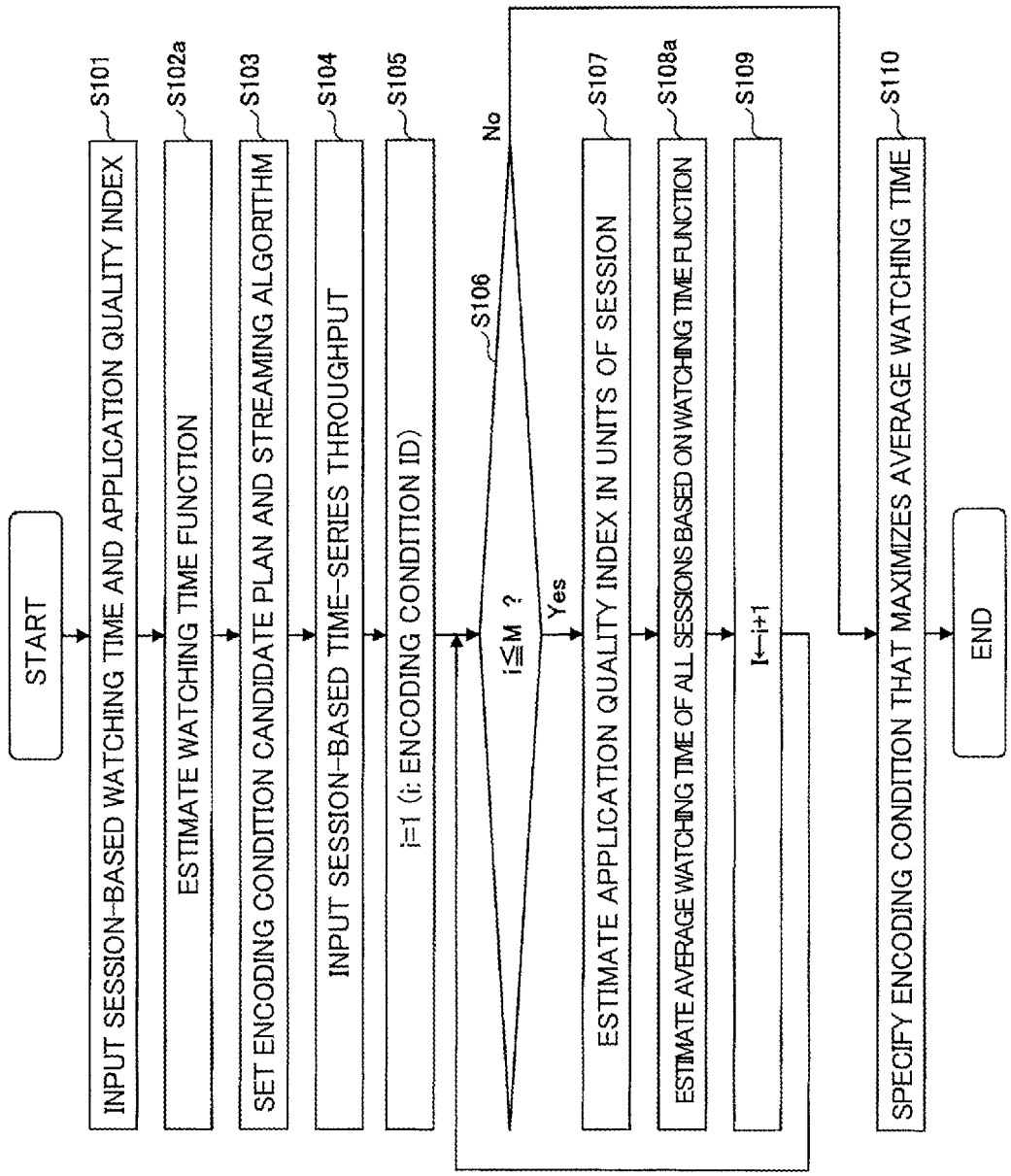
FIG. 9 is a flowchart for describing an example of a processing procedure executed by the streaming design assistance device 10 according to the fourth embodiment.

FIG. 9 is a flowchart for describing an example of the processing procedure executed by the streaming design assistance device 10 according to the fourth embodiment. In FIG. 9, the same steps as those of FIG. 3 will be denoted by the same step numbers and the description thereof will be omitted. As illustrated in FIG. 9, the flow of processing executed by the streaming design assistance device 10 is basically the same as that of the first embodiment. However, steps S102 and S108 are partially different, step S102 is replaced with step S102a and step S108 is replaced with step S108a.

Specifically, in step S102a, the watching time function estimation unit 14 estimates the watching time function. In step S108a, the encoding condition optimization unit 13 estimates the average watching time on the basis of Formula (3). In this case, the probability density function $f(z_i,t)$ in Formula (3) is represented by Formula (11).

Hereinabove, one embodiment based on an acceleration model (a case where the application quality index only is considered as the factor that affects the abandonment rate) has been described. Similarly to the case of the proportional hazard model, a case where the application quality index and the user attribute are considered, a case where the application quality index and the content attribute are considered, and a case where all factors including the application quality index, the user attribute, and the content attribute are considered may be exemplified as other embodiments. That is, at least one of the second and third embodiments may be combined with the fourth embodiment.

In the above description, examples of a proportional hazard model and an acceleration model are exemplified. However, in addition to these models, various regression models such as a linear regression model, a nonlinear regression model, a regression tree model, a random forest model, a support vector regression model, a neural network model, or a Bayesian network model may be used as a model that estimates the watching time.

In the present embodiment, the abandonment rate function estimation unit 11 or the watching time function estimation unit 14 is an example of a first estimation unit. The application quality index estimation unit 12 is an example of a second estimation unit. The encoding condition optimization unit 13 is an example of a third estimation unit.

While embodiments of the present invention have been described, the present invention is not limited to the above-described specific embodiments, and various modifications and changed can be made without departing from the spirit of the present invention described in the claims.

REFERENCE SIGNS LIST

10 Streaming design assistance device
11 Abandonment rate function estimation unit
12 Application quality index estimation unit
13 Encoding condition optimization unit
14 Watching time function estimation unit
100 Drive device
101 Recording medium
102 Auxiliary storage device
103 Memory device
104 CPU
105 Interface device
B Bus

The invention claimed is:

1. A streaming design assistance method for causing a computer to:
estimate a relationship between a watching time or an abandonment rate and an application quality index, the relationship being estimated according to a mathematical model on the basis of an actual value of a watching time of each of a plurality of first sessions related to adaptive bitrate video streaming and an actual value of the application quality index of each of the first sessions, the application quality index being an index of a quality that a user experiences while the user watches a video provided by the adaptive bitrate video streaming;
estimate, on the basis of a plurality of encoding conditions related to the adaptive bitrate video streaming and an actual value of time-series throughput of each of a plurality of second sessions, a value of the application quality index of each of the second sessions for each of the plurality of encoding conditions, the plurality of second sessions being the same as or different from the plurality of first sessions; and
apply the estimated value of the application quality index under each of the encoding conditions to the estimated relationship to estimate an average watching time of the plurality of second sessions.

2. The streaming design assistance method according to claim 1, wherein the estimating of the relationship further involves estimating a relationship between a user attribute and the watching time or the abandonment rate on the basis of an actual value of the user attribute.

3. The streaming design assistance method according to claim 1, wherein the estimating of the relationship further involves estimating a relationship between a content attribute and the watching time or the abandonment rate on the basis of an actual value of the content attribute.

4. The streaming design assistance method according to claim 1, wherein the applying of the application quality index involves specifying the encoding condition in which the average watching time is the largest.

5. The streaming design assistance method according to claim 1, wherein the application quality index is a playback stop percentage, a playback stop count percentage, an average bitrate, a frame rate, a playback start delay, a normalized playback stop time, a bitrate change percentage, or an accumulated bitrate change time.

6. A streaming design assistance device comprising:
a processor; and
a memory storing program instructions that cause the processor to:
estimate a relationship between a watching time or an abandonment rate and an application quality index, the relationship being estimated according to a mathematical model on the basis of an actual value of a watching time of each of a plurality of first sessions related to adaptive bitrate video streaming and an actual value of the application quality index of each of the first sessions, the application quality index being an index of a quality that a user experiences while the user watches a video provided by the adaptive bitrate video streaming;
estimate, on the basis of a plurality of encoding conditions related to the adaptive bitrate video streaming and an actual value of time-series throughput of each of a plurality of second sessions, a value of the application quality index of each of the second sessions for each of the plurality of encoding conditions, the plurality of second sessions being the same as or different from the plurality of first sessions; and
apply the estimated value of the application quality index under each of the encoding conditions to the estimated relationship to estimate an average watching time of the plurality of second sessions.

7. The streaming design assistance device according to claim 6, wherein the processor specifies the encoding condition in which the average watching time is the largest.

8. A non-transitory computer-readable storage medium that stores therein a program for causing a computer to execute the streaming design assistance method according to claim 1.

9. The streaming design assistance device according to claim 6, wherein the application quality index is a playback stop percentage, a playback stop count percentage, an average bitrate, a frame rate, a playback start delay, a normalized playback stop time, a bitrate change percentage, or an accumulated bitrate change time.

* * * * *